United States Patent
Beall et al.

(12) 
(10) Patent No.: US 6,566,290 B2
(45) Date of Patent: May 20, 2003

(54) LITHIUM ALUMINOSILICATE CERAMIC

(75) Inventors: Douglas M. Beall, Painted Post, NY (US); George H. Beall, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 95 days.

(21) Appl. No.: 09/969,569

(22) Filed: Oct. 1, 2001

(65) Prior Publication Data

US 2002/0042339 A1 Apr. 11, 2002

Related U.S. Application Data

(60) Provisional application No. 60/237,178, filed on Oct. 2, 2000.

(51) Int. Cl.⁷ .......................... C04B 35/19; B01D 39/20
(52) U.S. Cl. .......................... 501/128; 501/80; 55/523; 55/DIG. 30; 264/630
(58) Field of Search ..................... 501/80, 128; 55/523, 55/DIG. 30; 264/630

(56) References Cited

U.S. PATENT DOCUMENTS

| | | | |
|---|---|---|---|
| 5,179,051 A | 1/1993 | Bedard et al. | 501/128 |
| 5,403,787 A | 4/1995 | Day | 501/7 |
| 6,066,585 A | 5/2000 | Swartz | 501/128 |
| 6,206,944 B1 | 3/2001 | Hickman | 55/523 |

OTHER PUBLICATIONS

Xu et al., "Structural mechanisms underlying near–zero thermal expansion in β–eucryptite: A combined synchrotron x–ray and neutron Rietveld analysis", J. Mat. Res., vol. 14, No. 7, Jul. 1999, pp. 3138–3151.

Gillery et al., "Thermal Contraction of β–eucryptite ($Li_2O \cdot Al_2O_3 \cdot 2SiO_2$) by x–ray and dilatometer methods", J. of American Ceramic Society, vol. 42, No. 4, pp. 175–177.

*Primary Examiner*—Karl Group
(74) *Attorney, Agent, or Firm*—Anca C. Gheorghiu

(57) ABSTRACT

A ceramic article which consists essentially, by weight on the oxide basis, of 10–25% $SiO_2$, 65–85% $Al_2O_3$, and 2–12% $Li_2O$ and comprises beta-eucryptite as a first phase having a negative component in thermal expansion and a melting point $T_{m1}$, and a second phase having a positive component in thermal expansion which is higher than the component in thermal expansion of the first phase and a melting point $T_{m2}$, wherein $T_{m2} > T_{m1}$, wherein the first phase is at most 50% by weight of the ceramic, and wherein the ceramic is characterized by microcracking. $T_{m2}$ is at least 1800° C. The ceramic article exhibits a near zero coefficient of thermal expansion from room temperature to 800° C., a high refractoriness, and a high resistance to thermal shock properties which make the inventive ceramic extremely desirable in high temperature applications, such as filters for diesel exhaust engines.

36 Claims, No Drawings

LITHIUM ALUMINOSILICATE CERAMIC

This application claims the benefit of U.S. Provisional Application No. 60/237,178, filed Oct. 2, 2000, entitled "Lithium Aluminosilicate Ceramic", by Beall et al.

BACKGROUND OF THE INVENTION

The instant invention relates to ceramic bodies or structures having compositions within the $Li_2O$—$Al_2O_3$—$SiO_2$ (lithium aluminosilicate) system. Specifically, the present invention relates to lithium aluminosilicate ceramics having a low coefficient of thermal expansion (CTE), high heat capacity, high refractoriness, and high thermal shock resistance.

In the industry cordierite ($2MgO$—$2Al_2O_3$—$5SiO_2$) has been the cost-effective material of choice for high temperature filtering applications, such as flow-through and wall-flow filters, due to its combination of good thermal shock resistance, filtration efficiency, and durability under most operating conditions.

However, under certain circumstances cordierite filters are susceptible to damage and have even catastrophically failed.

A need therefore exists for a ceramic suitable for high temperature filtering applications without the shortfalls of cordierite.

The present invention provides such a ceramic and a method of fabricating the same.

SUMMARY OF THE INVENTION

The instant invention is founded upon the discovery of a predominately two-phase ceramic within the $Li_2O$—$Al_2O_3$—$SiO_2$ system which has high refractoriness, high resistance to thermal shock, and high heat capacity properties which make the inventive ceramic extremely desirable in high temperature applications, such as filters for diesel exhaust engines.

Specifically the invention is a ceramic article which consists essentially, by weight on the oxide basis, of 10–25% $SiO_2$, 65–85% $Al_2O_3$, and 2–12% $Li_2O$ and is composed of a first phase having anisotropic thermal expansion behavior (widely differing expansions along the crystallographic axes) with an average coefficient of thermal expansion from room temperature to 1000° C. of $-5 \times 10^{-7}$/° C. and being less than 50% by weight of the ceramic article, and a second phase having a higher melting point than the melting point of the first phase. The melting point of the second phase is preferably at least 1800° C.

The inventive ceramic structures have 32 to 50 weight % of beta-eucryptite ($LiAlSiO_4$) as a first phase having a melting point $T_{m1}$, and 50 to 68 weight % of a second phase having a positive component in thermal expansion which is higher than the component in thermal expansion of the first phase and a melting point $T_{m2}$, wherein $T_{m2} > T_{m1}$. The second phase is selected from the group consisting of lithium aluminate spinel ($LiAl_5O_8$), lithium aluminate ($LiAlO_2$), corundum ($Al_2O_3$), and combinations thereof.

The inventive ceramic structures exhibit a coefficient of thermal expansion (CTE) from room temperature to 800° C. of $-30 \times 10^{-7}$/° C. to $+30 \times 10^{-7}$/° C., preferably $-20 \times 10^{-7}$/° C. to $+10 \times 10^{-7}$/° C.; a permeability of at least $0.5 \times 10^{-12}$ m², preferably $1.0 \times 10^{-12}$ m² to $5.0 \times 10^{-12}$ m²; a total porosity of 35–65%, preferably 45–55%; a median pore size of 8–25 micrometers, preferably 15–20 micrometers; and, a high refractoriness at temperatures of between 1550° C. to 1650° C.

The inventive ceramic structures are suitable in high temperature applications such as filters for diesel exhaust and automotive catalytic converters. In particular the inventive structure is especially suitable as a honeycomb diesel particular filter having an inlet end and an outlet end and a multiplicity of cells extending from the inlet end to the outlet end, the cells having porous walls, wherein part of the total number of cells at the inlet end are plugged along a portion of their lengths, and the remaining part of cells that are open at the inlet end are plugged at the outlet end along a portion of their lengths, so that an engine exhaust stream passing through the cells of the honeycomb from the inlet end to the outlet end flows into the open cells, through the cell walls, and out of the structure through the open cells at the outlet end.

The invention is also a method of making the ceramic article. A mixture of lithium carbonate, alumina, clay and/or sand, solvent, optionally binders, lubricants and plasticizers are formed into a plasticized batch, shaped into a green body, optionally dried, and fired at temperatures of 1300° C.–1400° C. and for a time sufficient to form the product structure.

DETAILED DESCRIPTION OF INVENTION

The invention is a ceramic which is largely biphasic, having as a first phase a low CTE phase and as a second phase a high melting temperature phase (the high temperature phase may include more than a single phase as further described herein below). This unique phase duality renders the inventive structure, highly refractory with a near-zero CTE, thus making it suitable for high temperature applications such as filtering of particulate matter from diesel exhaust streams.

The inventive composition area lies within the $Li_2O$—$Al_2O_3$—$SiO_2$ (LAS) system and consists essentially, by weight on the oxide basis, of about 10–25 $SiO_2$, 65–85 $Al_2O_3$, and 2–20 $Li_2O$. The preferred compositional area consists essentially, by weight on the oxide basis, of about 13–20 $SiO_2$, 70–80 $Al_2O_3$, and 3.5–10 $Li_2O$. Minor amounts of other refractory oxides, such as $ZrO_2$, $Cr_2O_3$, $V_2O_3$, and $Ta_2O_5$ may optionally be present.

In a preferred embodiment the inventive structure includes 32 to 50% by weight a first phase of beta-eucryptite having a melting point $T_{m1}$, and 50 to 68% by weight a second phase having a positive component in thermal expansion which is higher than the component in thermal expansion of the first phase and a melting point $T_{m2}$, wherein $T_{m2} > T_{m1}$.

The low CTE phase is beta-eucryptite ($LiAlSiO_4$) which has an average CTE from room temperature to 1000° C. of about $-5 \times 10^{-7}$/° C., and with a highly anisotropic CTE (i.e., widely differing expansions along the crystallographic axes) at the a-axis of about $+80 \times 10^{-7}$/° C. and at the c-axis of about $-170 \times 10^{-7}$/° C.

However, beta-eucryptite also has a low melting point of about 1410° C. Therefore, the amount of beta-eucryptite in the final body is less than about 50 percent by weight, and more preferably between about 32 to 45 weight percent to insure that the effective melting temperature of the final body is not compromised. In other words the majority of the ceramic is composed of the high temperature phase.

The high temperature phase has a melting point higher than that of beta-eucryptite, preferably higher than 1800° C. The high temperature phase is selected from the group consisting of lithium aluminate spinel ($LiAl_5O_8$), lithium aluminate ($LiAlO_2$), corundum ($Al_2O_3$), and combinations thereof. Lithium aluminate spinel has a melting point of about 1960° C. Corundum has a melting point of about 2020° C. $LiAlO_2$ has a melting point of about 1850° C.

All three of these phases have a high CTE. Lithium aluminate spinel has a CTE from room temperature to 1000°

C. of about 85×10⁻⁷/° C., while corundum has a CTE from room temperature to 1000° C. of 84×10⁻⁷/° C. It is preferred that the second high temperature phase be lithium aluminate spinel because it is in thermodynamic equilibrium with $LiAlSiO_4$ in the solid state, and also forms a rigid network in combination with liquids near this composition in the partially molten state. Therefore, in an especially preferred embodiment the inventive ceramic comprises about 35 weight % beta-eucryptite and 65 weight % lithium aluminate spinel.

The large CTE mismatch between the beta-eucryptite phase and the high temperature phase promotes microcracking either along grain boundaries between beta-eucryptite crystals or between the beta-eucryptite and the high temperature phases which leads to a CTE over a temperature range from room temperature to 800° C. of from −30×10⁻⁷/° C. to 30×10⁻⁷/° C., preferably −20×10⁻⁷/° C. to 10×10⁻⁷/° C., resulting in excellent thermal shock resistance in the inventive structure. Microcracked bodies tend to bias the CTE towards the most negative CTE component because the opening of microcracks on cooling accommodates the normal positive components.

In addition the inventive structure exhibits high refractoriness at temperatures of 1550° C. to 1650° C. Refractoriness is a measure of the deformation in the structure when exposed to high temperatures such as above 1500° C., for a period of time in duration about 10 hours. The extremely high refractoriness in the inventive structure is believed to be the result of the spinel framework maintaining continuity and the beta-eucryptite rich melt attaching itself to the spinel network.

Another advantage in the inventive structure is high permeability by virtue of high, interconnected porosity and large median pore size. The permeability is at least about $0.5 \times 10^{-12}$ m², and preferably between about $1.0 \times 10^{12}$ m² to $5 \times 10^{-12}$ m². Permeability is a measure of how easily a fluid can flow through a porous structure. At a constant temperature and fluid viscosity the permeability depends on the percent open porosity, pore size and how well connected the pores are to one another.

The open porosity is between about 35–65%, by volume, and preferably between about 45–55%, by volume. The median pore size is between about 8–25 micrometers, and preferably between about 15–20 micrometers to maintain good filtration efficiency. Open porosity reported as volume percent and pore size reported as median pore diameter in micrometers are measured by mercury porosimetry.

The invention also relates to a method for fabricating the inventive LAS structure. A mixture is formed from raw materials which include lithium carbonate, an alumina-forming source, a silica-forming source and/or kaolin selected to form a composition which consists essentially, by weight on the oxide basis, of about 10–25 $SiO_2$, 65–85 $Al_2O_3$, and 2–20 $Li_2O$, and preferably about 13–20 $SiO_2$, 70–80 $Al_2O_3$, and 3.5–10 $Li_2O$. Table 1 reports examples of compositions and the resulting phase assemblages according to the present invention.

Raw materials are blended together with organic constituents that may include plasticizers, lubricants, binders, and solvents. Water may also optionally be added as a solvent. The mixture is shaped into a green body, optionally dried, and then fired at a temperature and for a time sufficient to form the final product structure.

The alumina forming source is a powder which, when heated to a sufficiently high temperature in the absence of other raw materials, yields substantially pure aluminum oxide, and includes alpha-alumina, a transition alumina such as a gamma-alumina or rho-alumina, boehmite, aluminum hydroxide, and mixtures thereof. Alpha-alumina is preferred.

The particle size of alumina-forming source particle size has to be sufficiently large for microcraking to be induced in the final structure, and small enough for good extrusion to occur. The high temperature phase inherits the grain size and morphology from the alumina-forming source. Accordingly the particle size of the alumina-forming source has to be at least 10 micrometers and no greater than 50 micrometers, preferably between about 15 to 25 micrometers; single crystal particles below 10 micrometers there would result in insufficient strain along grain boundaries with adjacent differing CTE to develop microcracking; single crystal particles above 50 micrometers would result in large microcracks which may extend during thermal cycling across webs. The morphology of the alumina source is also important and has to be macrocrystalline with no aggregates of fine crystallites.

The silica-forming source includes, but is not limited to, quartz. Optionally, kaolin (which aids in the extrusion process) may be added, preferably in an amount no greater than 20% by weight.

The inventive structure is particularly suitable for high temperature filtration applications. In particular the inventive structures are particularly suitable for diesel particulate filter applications. For such applications the raw material mixture is preferably shaped by extrusion into a honeycomb multicellular structure, as known in the art.

The resulting shaped green honeycomb bodies are usually dried and heated to a maximum temperature of about 1300–1400° C. over a period of about 28 hours, and held at the maximum temperature for about 6–10 hours.

While the construction of the filter can have any shape or geometry suitable for a particular application, it is preferred that it be multicellular structures such as a honeycomb structures. The honeycomb structure has an inlet and outlet end or face, and a multiplicity of cells extending from the inlet end to the outlet end, the cells having porous walls. The inventive filters have cellular densities from about 100 cells/in² (15.5 cells/cm²) to about 400 cells/in² (62 cells/cm²).

To obtain a filtering device, a portion of the cells of the honeycomb at the inlet end or face are plugged, as known in the art. The plugging is only at the ends of the cells which is typically to a depth of about 5 to 20 mm, although this can vary. A portion of the cells on the outlet end but not corresponding to those on the inlet end are plugged. Therefore, each cell is plugged only at one end. The preferred arrangement is to have every other cell on a given face plugged as in a checkered pattern.

An advantage of the diesel particulate filters of the present invention have many advantages is a low pressure drop across the length of the filter and low back pressure against the engine comparable to commercially available SiC counterparts. The pressure drop across the filter is a function of the accumulation of the carbonaceous soot on the walls of the diesel particulate filter. As amount of soot accumulated increases, it creates a progressive increase in the resistance to flow of the exhaust gas through the walls of the filter and carbon soot layer. This resistance to flow is manifested as a pressure drop that can be measured across the length of the filter, and results in an increased back pressure against the engine.

Although the preferred application is for diesel particulate filters, it is to be noted that the inventive ceramic is equally suitable as automotive flow-through substrates.

EXAMPLES

To more fully illustrate the invention, the following non-limiting examples of extruded honeycombs are presented in Tables 2 and 3. All parts, portions and percentages are on a basis of total raw materials weight unless otherwise stated.

The combinations of lithium carbonate, quartz, alumina and kaolin shown in Table 2, are blended together with about 3 to 7 parts of methyl cellulose. Steric acid is added as a lubricant at about 0.5 to 1 part. The particle profiles of the raw materials are also shown in the Table 2.

Subsequently about 20 to 30 parts of deionized water are gradually added to each powder mixture in a muller. After kneading, the combined ingredients are extruded through a die into honeycomb bodies having approximately 100 to 200 cells per square inch and having a wall thickness of about 0.010 to 0.025 inch. The bodies thus formed are cut to desired lengths and heated in an oven at 95° C. until dried.

The samples are fired in an electrically heated furnace at rates ranging from 20° C./hr to 100° C./hr over various temperature intervals to a maximum temperature of 1350 to 1400° C. for a period of 28 hours, with a hold at the maximum temperature for about 6–10 hours to develop the final product structure, and cooled by shutting off power to the furnace, as presented in Table 3.

Table 3 reports physical properties as determined on the examples. Porosities and pore sizes of selected samples were characterized by mercury porosimetry. Total porosity is reported in volume percent and pore sizes in micrometers. The permeability was determined as described above and is reported in $10^{-12}$ m$^2$. Mean coefficients of thermal expansion from 22 to 800° C. were measured using a dilatometer and are reported in $10^{-7}$/° C.

Examples 1 through 7 have 35% by weight (of the total body) beta-eucryptite and 65% by weight (of the total body) lithium aluminate spinel. Example 8 has 30% by weight beta-eucryptite and 70% by weight lithium aluminate spinel. At 30% by weight beta-eucryptite, Example 8 displays a thermal expansion coefficient greater than $30 \times 10^{-7}$/° C., which is undesirable in diesel particulate filtration. Therefore, preferably for such applications beta-eucryptite is at a level of between 32%. Example 8 also displays unacceptable levels of permeability, total porosity and median pore size.

In addition to Example 8, Examples 1, 2, and 3 are comparative because these examples also have thermal expansion coefficients greater than $30 \times 10^{-7}$/° C. The unacceptably high thermal expansion coefficients in these example result from the use of an alumina-forming source having a particle size distribution outside of the range of 10 to 50 micrometers. Example C which has an alumina median particle size of 60 micrometers exhibited an unusually large CTE of $63.5 \times 10^{-7}$/° C. Upon further analysis it was discovered that although the median particle size was determined to be 60 micrometers, the alumina grains of that particular alumina-source were about 1 micrometer. In fact, the individual alumina particles were an agglomeration of a plurality of these 1 micron alumina grains. Therefore, in the present invention it is important that the alumina-source have particles which are individual grains between 10 and 50 micrometers, and preferably between about 15 to 25 micrometers.

An advantage of the present inventive filtering structures is decreased reaction with metal oxide "ash" particles that are carried by exhaust gas in automobile engines. Metal oxide "ash" particles are not combustible and, therefore, are not removed during regeneration. A problem which exists in the industry is that if temperatures during the regeneration process reach sufficiently high values, the ash may sinter to the filter material or even react with the filter material resulting in partial melting.

Inventive bodies were brought into contact with metal oxide ash and heater to about 1200° C. There was no obvious (observable) reaction; in contrast, in commercially available cordierite filters under similar testing conditions there was sintering and melting at these temperatures.

It should be understood that while the present invention has been described in detail with respect to certain illustrative and specific embodiments thereof, it should not be considered limited to such but may be used in other ways without departing from the spirit of the invention and the scope of the appended claims.

TABLE 1

| Oxide Composition (wt. %) | A | B | C | D | E |
|---|---|---|---|---|---|
| SiO$_2$ | 19.1 | 21.5 | 23.9 | 16.7 | 16.7 |
| Al$_2$O$_3$ | 72.7 | 70.1 | 67.4 | 75.6 | 79.6 |
| Li$_2$O | 8.2 | 8.4 | 8.7 | 7.7 | 3.8 |
| Phase Assemblage | LiAlSiO$_4$ LiAl$_5$O$_8$ | LiAlSiO$_4$ LiAl$_5$O$_8$ | LiAlSiO$_4$ LiAl$_5$O$_8$ | LiAlSiO$_4$ LiAl$_5$O$_8$ | LiAlSiO$_4$ ss LiAl$_5$O$_8$ Al$_2$O$_3$ |

| Oxide Composition (wt. %) | F | G | H | I | J |
|---|---|---|---|---|---|
| SiO$_2$ | 16.7 | 14.4 | 16.7 | 16.7 | 16.7 |
| Al$_2$O$_3$ | 73.6 | 83.2 | 68.1 | 71.9 | 64.4 |
| Li$_2$O | 9.8 | 2.4 | 15.2 | 11.5 | 18.9 |
| Phase Assemblage | LiAlSiO$_4$ LiAl$_5$O$_8$ mLiAlO$_2$ | LiAlSiO$_4$ ss Al$_2$O$_3$ | LiAlSiO$_4$ LiAl$_5$O$_8$ LiAlO$_2$ | LiAlSiO$_4$ LiAl$_5$O$_8$ LiAlO$_2$ | LiAlSiO$_4$ LiAlO$_2$ mLiAl$_5$O$_8$ | m-minor phase
ss-solid solution

TABLE 2

| Example Number | 1 | 2 | 3 | 4 | 5 | 6 | 7 | 8 |
|---|---|---|---|---|---|---|---|---|
| Example Type | comp. | comp. | comp. | inv. | inv. | inv. | inv. | comp. |
| Raw Material Composition (Median Particle Size (micrometers)) | | | | | | | | |
| Li$_2$CO$_3$ (6) | 17.2 | 17.2 | 17.2 | 17.2 | 17.2 | 17.2 | 17.2 | 16.91 |
| Quartz 1 (6) | — | 14.96 | 14.96 | — | — | — | — | — |
| Quartz 2 (17) | — | — | — | 14.96 | — | — | — | — |
| Quartz 3 (17) | — | — | — | — | 14.96 | 14.96 | 6.89 | 8.83 |
| Alumina 1 (5) | 53.88 | 67.8 | — | — | — | — | — | — |
| Alumina 2 (60*) | — | — | 67.8 | — | — | — | — | — |
| Alumina 4 (15) | — | — | — | 67.8 | 67.8 | 67.8 | 59.69 | 66.41 |
| Kaolin 1 (1) | — | — | — | — | — | — | 16.61 | 8.4 |

TABLE 2-continued

| | | | | | | | | |
|---|---|---|---|---|---|---|---|---|
| Kaolin 2 (4) | 16.13 | — | — | — | — | — | — | — |
| Calcined Kaolin 1 (1) | 13.19 | — | — | — | — | — | — | — |

*In this case 60 micrometers average size refers to the size of spheres of fine agglomerated alumina.

TABLE 3

| Example Number | 1 | 2 | 3 | 4 | 5 | 6 | 7 | 8 |
|---|---|---|---|---|---|---|---|---|
| Example Type | comp. | comp. | comp. | inv. | inv. | inv. | inv. | comp. |
| Oxide Composition (wt. %) | | | | | | | | |
| $SiO_2$ | 16.67 | 16.67 | 16.67 | 16.67 | 16.67 | 16.67 | 16.67 | 14.29 |
| $Al_2O_3$ | 75.58 | 75.58 | 75.58 | 75.58 | 75.58 | 75.58 | 75.58 | 78.08 |
| $LiO_2$ | 7.75 | 7.75 | 7.75 | 7.75 | 7.75 | 7.75 | 7.75 | 7.43 |
| Phase Assemblage | | | | | | | | |
| Beta-Eucryptite (wt. %) | 35 | 35 | 35 | 35 | 35 | 35 | 35 | 30 |
| Lithium Aluminate Spinel (wt. %) | 65 | 65 | 65 | 65 | 65 | 65 | 65 | 70 |
| Properties | | | | | | | | |
| Mean CTE (22–800° C.) ($10^{-7}$/° C.) | 55 | 50.3 | 63.5 | −3.5 | −15.8 | 9.8 | −1.8 | 32.0 |
| Permeability ($10^{-12}$ $m^2$) | — | — | — | — | 4.5 | 3.5 | 1.4 | 44.6 |
| Total Porosity (% vol.) | — | 25 | 34.8 | 34.8 | 55.2 | 38.1 | 47.2 | 14.2 |
| Median Pore Size (micrometers) | — | 6 | 13 | 13 | 23 | 22 | 16 | 1.3 |

It is claimed:

1. A ceramic comprising beta-eucryptite ($LiAlSiO_4$) as a first phase having a negative component in thermal expansion and a melting point $T_{m1}$, and a second phase having a positive component in thermal expansion which is higher than the component in thermal expansion of the first phase and a melting point $T_{m2}$, wherein $T_{m2} > T_{m1}$, wherein the first phase is at most 50% by weight of the ceramic, and wherein the ceramic is characterized by microcracking.

2. The ceramic of claim 1 wherein the second phase has a $T_{m2}$ of at least 1800° C.

3. The ceramic of claim 2 wherein the second phase is selected from the group consisting of lithium aluminate spinel ($LiAl_5O_8$), lithium aluminate ($LiAlO_2$), corundum ($Al_2O_3$), and combinations thereof.

4. The ceramic of claim 3 wherein the second phase is lithium aluminate spinel ($LiAl_5O_8$).

5. The ceramic of claim 1 wherein the first phase is beta-eucryptite ($LiAlSiO_4$) and the second phase is lithium aluminate spinel ($LiAl_5O_8$).

6. The ceramic of claim 5 wherein the beta-eucryptite is 32–50% by volume and lithium aluminate spinel is 50–68% by volume.

7. The ceramic of claim 6 wherein the beta-eucryptite is 35–40 weight % and lithium aluminate spinel is 55–60 weight %.

8. The ceramic of claim 7 wherein the beta-eucryptite is 35 weight % and lithium aluminate spinel is 65 weight %.

9. The ceramic of claim 1 wherein the ceramic has a mean coefficient of thermal expansion is −30×$10^{-7}$/° C. to +30×$10^{-7}$/° C. from room temperature to 800° C.

10. The ceramic of claim 9 wherein the ceramic has a mean coefficient of thermal expansion is −20×$10^{-7}$/° C. to +10×$10^{-7}$/° C. from room temperature to 800° C.

11. The ceramic of claim 10 wherein the ceramic has a permeability of at least 0.5×$10^{-12}$ $m^2$.

12. The ceramic of claim 11 wherein the permeability is 1.0–5.0×$10^{-12}$ $m^2$.

13. The ceramic of claim 12 wherein the ceramic has a median pore size of between 8–25 micrometers.

14. The ceramic of claim 13 wherein the ceramic has a median pore size of between 15–20 micrometers.

15. The ceramic of claim 14 wherein the ceramic has a total porosity of at least between 35–65% by volume.

16. The ceramic of claim 15 wherein the total porosity is between 45–55% by volume.

17. A structure which consists essentially, by weight on the oxide basis, of 10–25% $SiO_2$, 65–85% $Al_2O_3$, and 2–12% $LiO_2$, having a first phase of beta-eucryptite ($LiAlSiO_4$) and a second phase selected from the group consisting of lithium aluminate spinel ($LiAl_5O_8$), lithium aluminate ($LiAlO_2$), corundum ($Al_2O_3$), and combinations thereof, wherein the first phase is at most 50% by weight of the structure and the structure is characterized by microcracking.

18. The structure of claim 17 consisting essentially, by weight on the oxide basis, of 13–20% $SiO_2$, 70–80% $Al_2O_3$, and 3.5–10% $Li_2O$.

19. The structure of claim 17 wherein the first phase is beta-eucryptite ($LiAlSiO_4$) and the second phase is lithium aluminate spinel ($LiAl_5O_8$).

20. The structure of claim 19 wherein the beta-eucryptite is 32–50% by volume and lithium aluminate spinel is 50–68% by volume.

21. The structure of claim 20 wherein the beta-eucryptite is 35% by volume and lithium aluminate spinel is 65% by volume.

22. The structure of claim 17 wherein the structure has a mean coefficient of thermal expansion of −30×$10^{-7}$/° C. to 30×$10^{-7}$/° C. from room temperature to 800° C.

23. The structure of claim 22 wherein the structure has a permeability of at least 0.5×$10^{-12}$ $m^2$.

24. The structure of claim 23 wherein the permeability is 1.5–5×10$^{-12}$ m$^2$.

25. The structure of claim 24 wherein the structure has a median pore size of between 8–25 micrometers.

26. The structure of claim 25 wherein the structure has a total porosity of at least between 35–65% by volume.

27. The structure of claim 26 wherein the total porosity is between 45–55% by volume.

28. The structure of claim 27 wherein the structure is used as a wall-flow diesel engine filter.

29. The structure of claim 28 having the shape of a honeycomb, the honeycomb having an inlet end and an outlet end, and a multiplicity of cells extending from the inlet end to the outlet end, the cells having porous walls, wherein part of the total number of cells at the inlet end are plugged along a portion of their lengths, and the remaining part of cells that are open at the inlet end are plugged at the outlet end along a portion of their lengths, so that an engine exhaust stream passing through the cells of the honeycomb from the inlet end to the outlet end flows into the open cells, through the cell walls, and out of the structure through the open cells at the outlet end.

30. A diesel particulate filter comprising a ceramic article which consists essentially, by weight on the oxide basis, of 10–25% SiO$_2$, 65–85% Al$_2$O$_3$, and 2–12% Li$_2$O and has a first phase of beta-eucryptite (LiAlSiO$_4$) and a second phase selected from the group consisting of lithium aluminate spinel (LiAl$_5$O$_8$), lithium aluminate (LiAlO$_2$), corundum (Al$_2$O$_3$), and combinations thereof, wherein the first phase is at most 50% by weight of the ceramic, and wherein the filter has the shape of a honeycomb, wherein the honeycomb has an inlet end and an outlet end and a multiplicity of cells extending from the inlet end to the outlet end, the cells having porous walls, wherein part of the total number of cells at the inlet end are plugged along a portion of their lengths, and the remaining part of cells that are open at the inlet end are plugged at the outlet end along a portion of their lengths, so that an engine exhaust stream passing through the cells of the honeycomb from the inlet end to the outlet end flows into the open cells, through the cell walls, and out of the structure through the open cells at the outlet end.

31. A method of making a ceramic comprising:

a) selecting raw materials to form a composition which forms a ceramic with a Li$_2$O—Al$_2$O$_3$—SiO$_2$ system, the composition consisting essentially, by weight on the oxide basis, of 10–25% SiO$_2$, 65–85% Al$_2$O$_3$, and 2–12% Li$_2$O, the raw materials being composed of:
lithium carbonate;
an alumina-forming source having a mean particle size of between 10 and 50 micrometers; and,
a silica-forming source;

b) blending the raw materials to form a plasticized mixture;

c) shaping the plasticized mixture into a green body;

d) firing the green body to produce a ceramic including a first phase having a first phase having a negative component in thermal expansion, and a second phase having a melting point above 1800° C. and a positive component in thermal expansion and being higher than the component in thermal expansion of the first phase, wherein the first phase is less than 50% by weight of the ceramic, and the microstructure of the ceramic is characterized by microcracking.

32. The method of claim 21 wherein the alumina-forming source has a mean particle size of between 15–25 micrometers.

33. The method of claim 31 wherein the alumina-forming source is selected from the group consisting of aluminum oxide, alpha-alumina, gamma-alumina, rho-alumina, boehmite, aluminum hydroxide, and mixtures thereof.

34. The method of claim 31 wherein the silica-forming source is quartz.

35. The method of claim 31 wherein the shaping is done by extrusion.

36. The method of claim 31 wherein the firing step is carried out at 1300–1400° C. over a period of 28 hours with a hold time of 6–10 hours.

* * * * *